United States Patent
Reinert

(10) Patent No.: US 11,091,154 B2
(45) Date of Patent: Aug. 17, 2021

(54) METHOD AND APPARATUS FOR RAPID STOPPING OF A MOTOR VEHICLE PARTICULARLY ON SNOW OR ICE

(71) Applicant: Gary L Reinert, Carnegie, PA (US)

(72) Inventor: Gary L Reinert, Carnegie, PA (US)

(73) Assignee: Gary L. Reinert, Sr., Carnegie, PA (US)

( * ) Notice: Subject to any disclaimer, the term of this patent is extended or adjusted under 35 U.S.C. 154(b) by 42 days.

(21) Appl. No.: 16/585,118

(22) Filed: Sep. 27, 2019

(65) Prior Publication Data

US 2020/0101970 A1    Apr. 2, 2020

Related U.S. Application Data

(60) Provisional application No. 62/737,347, filed on Sep. 27, 2018.

(51) Int. Cl.
| | |
|---|---|
| *B60W 30/09* | (2012.01) |
| *B60W 10/18* | (2012.01) |
| *B60W 10/10* | (2012.01) |
| *B60T 7/12* | (2006.01) |
| *B60T 7/04* | (2006.01) |

(Continued)

(52) U.S. Cl.
CPC .............. *B60W 30/09* (2013.01); *B60T 7/04* (2013.01); *B60T 7/12* (2013.01); *B60W 10/10* (2013.01); *B60W 10/18* (2013.01); *F16H 61/0246* (2013.01); *B60T 2220/04* (2013.01); *B60W 30/18109* (2013.01); *B60W 2540/12* (2013.01); *B60W 2555/20* (2020.02); *B60W 2710/1005* (2013.01)

(58) Field of Classification Search
CPC .......... B60W 30/18109; B60W 10/10; B60W 10/18; B60W 10/184; B60W 2555/20; B60W 2540/12; B60W 2710/1005
See application file for complete search history.

(56) References Cited

U.S. PATENT DOCUMENTS

| | | | |
|---|---|---|---|
| 2,959,071 A | * | 11/1960 | Wallach ................. F16H 3/721 475/197 |
| 3,415,537 A | | 12/1968 | Goggins |
| 3,976,335 A | | 8/1976 | Sekiguchi |

(Continued)

OTHER PUBLICATIONS

Sy Wong, Toyota Develops Automatic Brake System Assisted by GPS Technology for Safety Driving, http://www.mydigitallife.info/2008/02/13/toyota-develops-automatic-brake-system-assisted-by-gps-technology-for-safety-driving/.

(Continued)

*Primary Examiner* — David R Morris
(74) *Attorney, Agent, or Firm* — Blynn L. Shideler; Krisanne Shideler; BLK Law Group

(57) ABSTRACT

A method and associated apparatus for emergency stopping of a vehicle which has an electronic control unit (ECU) and speed sensors on each ground engaging wheel with other conventional components of a motor vehicle wherein once the apparatus for rapid stopping of a motor vehicle is activated, the brakes will stop the forward motion/rotation of each wheel and once the rotation of the tire is ceased the transmission is activated such that the tire will be driven in the reverse rotation until the vehicle is stopped, once the vehicle is stopped the transmission is placed into the original position or into park.

16 Claims, 1 Drawing Sheet

(51) Int. Cl.
  *F16H 61/02* (2006.01)
  *B60W 30/18* (2012.01)

(56) References Cited

U.S. PATENT DOCUMENTS

| | | | |
|---|---|---|---|
| 3,976,336 | A | 8/1976 | Sekiguchi |
| 4,035,034 | A | 7/1977 | Sekiguchi |
| 4,336,592 | A | 6/1982 | Beck |
| 5,195,606 | A * | 3/1993 | Martyniuk ............... B60T 7/02 |
| | | | 180/272 |
| 5,397,175 | A | 3/1995 | Matsunaga et al. |
| 5,492,512 | A * | 2/1996 | Wu ....................... B60K 17/02 |
| | | | 180/244 |
| 5,538,337 | A | 7/1996 | Harris et al. |
| 5,707,121 | A | 1/1998 | Harris et al. |
| 5,722,914 | A * | 3/1998 | Kang ................... B60T 8/3215 |
| | | | 477/187 |
| 5,979,503 | A | 11/1999 | Abboud et al. |
| 6,209,971 | B1 | 4/2001 | Ho et al. |
| 6,220,883 | B1 | 4/2001 | Helot et al. |
| 6,945,611 | B2 | 9/2005 | Mayer et al. |
| 7,159,954 | B2 | 1/2007 | Goebels et al. |
| 7,841,674 | B2 | 11/2010 | Goebels et al. |
| 8,500,219 | B2 | 8/2013 | Batistic |
| 8,561,749 | B2 | 10/2013 | Person et al. |
| 8,823,504 | B2 | 9/2014 | Custer et al. |
| 9,079,500 | B2 | 7/2015 | Custer et al. |
| 9,194,168 | B1 * | 11/2015 | Lu ...................... G06K 9/00805 |

OTHER PUBLICATIONS

The Volvo Owners' Club, New Collision Warning with Auto Brake helps prevent rear-end collisions, http://www.volvoclub.org.uk/press/releases/2007/collision_warning.shtml , "The Volvo Owners Club: New Collision Warning with Auto Brake helps prevent rear-end collisions", Aug. 29, 2007.
John Fuller, http://auto.howstuffworks.com/car-driving-safety/safety-regulatory-devices/pre-collision-systems2.htmhowstuffworks.com: How Pre-Collision Systems Work. Types of Pre-collision Systems.
Cicchino, Jessica "Effectiveness of Forward Collision Warning Systems with and without Autonomous Emergency Braking in Reducing Police-Reported Crash Rates". Insurance Institute for Highway Safety) Jan. 2016.

* cited by examiner

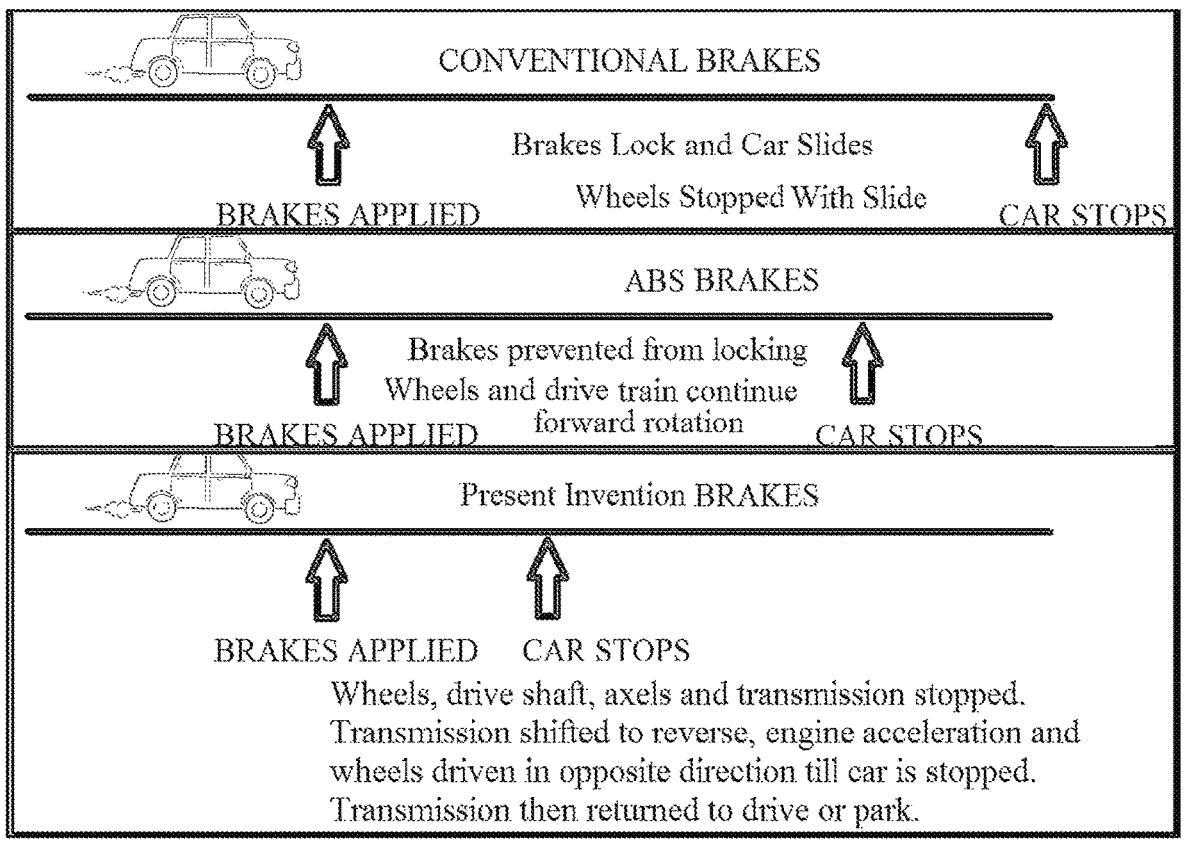

METHOD AND APPARATUS FOR RAPID STOPPING OF A MOTOR VEHICLE PARTICULARLY ON SNOW OR ICE

RELATED APPLICATIONS

This application claims the benefit of Provisional Application Ser. No. 62/737,347 filed Sep. 27, 2018 entitled "Method and Apparatus for Rapid Stopping of a Motor Vehicle Particularly on Snow and Ice", which application is incorporated herein by reference.

BACKGROUND OF THE INVENTION

Field of the Invention

The present invention pertains to motor vehicles, and more particularly to a method and an apparatus for rapid stopping of a motor vehicle, particularly when sliding on snow or ice or the like.

Background Information

Since the onset of motor vehicles there has been a need to safely and rapidly stop a moving motor vehicle. See for example U.S. Pat. No. 3,415,537 which is incorporated herein by reference and which discloses an apparatus to be attached to a motor vehicle for stopping a skid on a slippery service.

One development for the rapid stopping of a vehicle is the anti-skid braking system, now more commonly called anti-lock braking system, or merely ABS brakes. Early versions of such systems are described in U.S. Pat. Nos. 5,397,175; 4,336,592; 4,035,034; 3,976,336; and 3,976,335 which are incorporated herein by reference. Anti-lock brake systems (ABS) are now frequently included as standard equipment on modern vehicles and are currently required on almost all commercial vehicles. The operation of ABS is based on the principle that a skidding wheel (i.e., where the tire contact patch is sliding relative to the road) has less traction than a non-skidding wheel (i.e. the coefficient of sliding friction for the skidding wheel being lower than the coefficient of friction for the non-skidding wheel). Thus, by preventing a vehicle's wheels from skidding while the operator is attempting to reduce the speed of the vehicle, anti-lock brakes permit the vehicle to be stopped faster without compromising the operator's ability to steer or otherwise control the vehicle. Anti-lock brake systems provide rapid, automatic cadence braking in response to signs of incipient wheel locking by alternately increasing and decreasing brake pressure in the brake line(s) of the affected wheel(s). ABS systems typically include speed sensors, a plurality of valves, and an electronic control unit (ECU). The speed sensors, which are located on each controlled wheel, provide the ECU with data indicating that one or more of the wheels are about to lock up. A valve is located in the brake line of each brake controlled by the ABS system for releasing brake pressure from the brakes. For more recent developments in this area see U.S. Pat. Nos. 9,079,500; 8,823,504; 8,561,749; 8,500,219; 7,841,674; 7,159,954; 6,945,611; 6,220,883; 6,209,971; 5,979,503; 5,707,121; and 5,538,337 which are incorporated herein by reference.

There remains a need to improve upon rapid vehicle stopping technologies and designs and it is an object of the present invention is to provide an effective, efficient, and durable method and apparatus for rapidly stopping a vehicle, particularly when the vehicle is sliding on snow, ice, wet leaves or similar environments.

SUMMARY OF THE INVENTION

The object of the present invention is achieved according to one embodiment of the present invention in which the vehicle is quickly stopped by activation of the system of the invention. The activation of the system of the present invention is preferably through the vehicle operator pushing a separate "emergency stop" button. In certain embodiments it may be possible to implement the present system via the operator stepping on the brakes, or automatically activated via sensors in the car (particularly for a self-driving car. The system of the present invention when activated actuates the brake members of all four wheels to stop the forward rotation of each wheel and the associated drive train and transmission then immediately upon stopping of the wheels, drive train and transmission, the system of the present invention will engage the transmission to rotate the wheels in a reverse direction and release the brakes. The wheels are then actively driven by the engine and are rotated in the opposite direction from travel throughout the braking process until the vehicle comes to a stop, at which point the brake members are re-engaged with the wheels and the transmission is returned to the original drive setting or alternatively into a park setting.

One aspect of the present invention is on a vehicle that has an electronic control unit (ECU) and speed sensors on each ground engaging wheel with other conventional components of a motor vehicle wherein once the apparatus of the invention for rapid stopping of a motor vehicle is activated the brakes will stop the forward motion/rotation of each wheel and once the rotation of the tire is ceased the transmission is activated such that the tire will be driven in the reverse rotation until the vehicle is stopped or vehicle control will deactivate the reverse rotation, once the vehicle is stopped the transmission can be place into the original position or into a park position.

The features that characterize the present invention are pointed out with particularity in the claims which are part of this disclosure. These and other features of the invention, its operating advantages and the specific objects obtained by its use will be more fully understood from the following detailed description.

BRIEF DESCRIPTION OF THE DRAWING

The drawing is a schematic representation of three systems of braking including conventional braking of a vehicle, ABS braking of a vehicle and braking of a vehicle according to the present invention.

DESCRIPTION OF THE PREFERRED EMBODIMENTS

The present invention pertains to motor vehicles, and more particularly to a method and an apparatus for rapid stopping of a motor vehicle, particularly one sliding on snow, ice, wet leaves or the like, as there remains a need to safely and rapidly stop a moving motor vehicle. The drawing is a schematic representation of three systems of braking including conventional braking of a vehicle, ABS braking of a vehicle and braking of a vehicle according to the present invention. One embodiment of the present invention provides that the vehicle is quickly stopped by activation of the system of the invention. The activation of the system of the present invention is either through the vehicle operator pushing a separate "emergency stop" button, or through automatic implementation when the user presses hard (stamps) on the brake. In certain embodiments it may be possible to implement the present system via the operator stepping on the brakes, or automatically activated via sensors in the car (particularly for a self-driving car).

The system of the present invention when activated operates to actuate the brake members of all four wheels to stop the forward rotation of each wheel and the associated drive train and transmission then immediately upon stopping of the wheels, drive train and transmission, the system of the present invention will engage the transmission to rotate the wheels in a reverse direction and release the brakes. The wheels are then actively driven by the engine and are rotated in the opposite direction from travel throughout the braking process until the vehicle comes to a stop, at which point the brake members are re-engaged with the wheels and the transmission is returned to the original drive setting or alternatively into a park setting.

One aspect of the present invention is on a vehicle that has an electronic control unit (ECU) and speed sensors on each ground engaging wheel with other conventional components of a motor vehicle wherein once the apparatus of the invention for rapid stopping of a motor vehicle is activated the brakes will stop the forward motion/rotation of each wheel and once the rotation of the tire is ceased the transmission is activated such that the tire will be driven in the reverse rotation until the vehicle is stopped or vehicle control will deactivate the reverse rotation, once the vehicle is stopped the transmission can be place into the original position or into a park position.

As noted above, anti-lock brake systems (ABS) are now generally included as standard equipment on modern vehicles and are currently required on almost all commercial vehicles. ABS systems typically include speed sensors, a plurality of valves, and an electronic control unit (ECU). The speed sensors, which are located on each controlled wheel, provide the ECU with data indicating that one or more of the wheels are about to lock up. A valve is located in the brake line of each brake controlled by the ABS system for releasing brake pressure from the brakes. The present method and apparatus can utilize the equipment utilized in implementing ABS systems, as existing ABS systems already incorporate sensors associated with determining the spinning and slippage of wheels, and the control of the braking members of such a wheel. However, it should be clear from reading the present invention that the ABS system and method is the antithesis of the present system operating on almost the exact opposite premise. In the ABS system the wheels and drive train and transmission are intentionally never stopped but continue moving essentially in the direction of travel. In the present invention the exact opposite principle of operation is employed, namely the wheels are stopped then actively driven in the opposite direction of travel until the vehicle comes to a stop.

Automatic Braking is a well-known existing technology for automobiles to sense and avoid an imminent collision with another vehicle, person or obstacle by braking without any driver input. Sensors to detect other vehicles or obstacles can include radar, video, infrared, ultrasonic or other technologies. GPS sensors can detect fixed dangers such as approaching the stop signs through a location database. See mydigitallife.com: Toyota Develops Automatic Brake System Assisted by GPS Technology for Safety Driving. See http://www.mydigitallife.info/2008/02/13/toyota-develops-automatic-brake-system-assisted-by-gps-technology-for-safety-driving/; and "The Volvo Owners Club: New Collision Warning with Auto Brake helps prevent rear-end collisions." http://www.volvoclub.org.uk/press/releases/2007/collision warning.shtml; howstuffworks.com: How Pre-Collision Systems Work. Types of Pre-collision Systems. http://auto.howstuffworks.com/car-driving-safety/safety-regulatory-devices/pre-collision-systems2.htm Automatic braking after sensing an obstacle can be executed in two modes. In collision avoidance, the collision is avoided by the automatic braking, but the driver will not be warned by this type of system. In a collision mitigation system, the sensors detect the possibility of collision but will not take immediate action. A warning will be sent to the driver in the form of a signal or a voice message. There is a threshold safe distance calculated by the system, and if the driver fails to respond even when the vehicle crosses that region, only then will brakes will be applied automatically. Even if there is a miss-interpretation of signals, there is no problem, because the decision to apply brakes is left with the driver and the brakes are applied automatically only in the most emergency situations. Generally this emergency braking initiates ABS braking to help the driver to retain the control over vehicle without any skidding. An automatic braking system is only effective if the mode of sensing the obstacles is reliable, or else any kind of false interpretation may cause a lot of damage. In March 2016, 20 major auto-makers and the U.S. government came together to agree to making automatic-braking standard by 2022. In a study of police-reported crashes, automatic emergency braking was found to reduce the incidence of rear-end crashes by 39 percent. (see Cicchino, Jessica (2016). "*Effectiveness of Forward Collision Warning Systems with and without Autonomous Emergency Braking in Reducing Police-Reported Crash Rates*". Insurance Institute for Highway Safety)

The present method and apparatus can utilize some of the equipment utilized in implementing automatic braking system to provide an effective, efficient, and durable method and apparatus for rapidly stopping a vehicle, particularly a vehicle sliding on snow, ice, wet leaves, gravel, oily pavement or the like.

The essence of the present invention is that in certain situations when a vehicle is intended to be stopped, then stopping the wheels, drive train and transmission followed by the active rotation of the wheels in the direction opposite to the direction of travel will stop the vehicle faster than merely braking or braking with antilock brakes (ABS). The object of the present invention is achieved according to one embodiment of the present invention in which the vehicle has an electronic control unit (ECU) and speed sensors on each ground engaging wheel with other conventional components of a motor vehicle wherein once the apparatus for rapid stopping of a motor vehicle is activated (by the user or automatically via the car control itself once sliding is detected) the brakes will stop the forward motion/rotation of each wheel and the drive train and transmission, immediately upon the rotation of the tire and drive train being ceased the transmission is activated such that the tire will be actively driven in the reverse rotation until the vehicle is stopped, once the vehicle is stopped then the transmission can be placed into the original position or into park. The ECU can rapidly attend to these actions during the emergency stopping procedure of the present invention.

The activation of the present system and method will preferably be through user activation but alternatively may be through the standard Automatic braking activation by the vehicle controls. In other words the automatic braking may utilize the present system and method when activated and when the vehicle is within the operating parameters for the present system.

There are certain situations, such as on snow and ice, in which the present method will not only stop the vehicle faster than ABS system, but maintain greater control for the driver throughout the stopping procedure. The present invention intends to supplement the existing systems and operate or be controlled via the onboard ECE and or the user. The present method and apparatus is also perfectly suitable for self-driving vehicles, and such vehicles may include an activation button (an emergency stop or brake button) for passengers within the vehicle.

As present invention is particularly well suited for operation on snow and ice and the automatic implementation may include implementation only when there is a likelihood of snow and ice as part of the operating parameters. For example the system will be implemented only when the outside temperature is below 40 degrees Fahrenheit. Further many automobiles today know there geographic location as well as the time of year, such that the system is off if the car is located in Phoenix in July. If the system is off, then conventional ABS braking systems may be implemented by the automobile.

It will be apparent to those of ordinary skill in the art that various changes may be made to the present invention without departing from the spirit and scope thereof. The spirit and scope of the present invention is defined in the appended claims and equivalents thereto.

What is claimed is:

1. A method for emergency stopping of a motor vehicle comprising the steps of:
    activating the emergency stopping of the motor vehicle;
    stopping the forward rotation of each wheel immediately following the activation of the emergency stopping of the motor vehicle;
    activating a transmission of the vehicle, which shifts an engine of the motor vehicle between driving the wheels in the forward rotation direction, a neutral park position and a reverse rotation direction, immediately after the forward rotation motion of each wheel has ceased such that each wheel maybe driven in the reverse rotation direction;
    rotating each driven wheel in the reverse rotation direction until the vehicle is stopped;
    activating the transmission of the vehicle once the vehicle is stopped to place the transmission into the original forward rotation position or into the park position, wherein the step of activating the transmission includes using an on board electronic control unit whereby the method for emergency stopping of a motor vehicle is controlled by an on board electronic control unit, and wherein the step of activating the transmission includes using sensors on each ground engaging wheel.

2. The method for emergency stopping of a vehicle according to claim 1, wherein the activating the emergency stopping of the motor vehicle includes depressing an emergency stop button.

3. The method for emergency stopping of a vehicle according to claim 2, wherein the motor vehicle is a self-driving vehicle and the emergency stop button is accessible by a passenger.

4. The method for emergency stopping of a vehicle according to claim 1, wherein the method utilizes portions of an automatic braking system for rapidly stopping the vehicle.

5. The method for emergency stopping of a vehicle according to claim 1, wherein the activating the emergency stopping of the motor vehicle is implemented via the operator stepping on vehicle brakes.

6. The method for emergency stopping of a vehicle according to claim 1, wherein the implementing the activation via the operator stepping on vehicle brakes past a certain activation threshold on the brakes.

7. The method for emergency stopping of a vehicle according to claim 1, wherein the activating the emergency stopping of the motor vehicle is implemented automatically via sensors in the vehicle.

8. The method for emergency stopping of a vehicle according to claim 1, wherein the vehicle is stopping on snow, ice, or wet leaves.

9. A system for emergency stopping of a motor vehicle comprising:
    means for activating the emergency stopping of the motor vehicle;
    means for stopping the forward rotation of each wheel immediately following the activation of the emergency stopping of the motor vehicle;
    means for activating a transmission of the vehicle, which shifts an engine of the motor vehicle between driving the wheels in the forward rotation direction, a neutral park position and a reverse rotation direction, immediately once the forward rotation motion of each wheel has ceased such that each wheel may be driven in the reverse rotation direction and for Activating the transmission of the vehicle immediately once the vehicle is stopped to place the transmission into the original forward rotation position or into the park position, wherein the means for activating the transmission includes the on board electronic control unit whereby the method of using the system is controlled by the on board electronic control unit, and wherein the means for activating the transmission includes sensors on each ground engaging wheel; and
    means for rotating each driven wheel in the reverse rotation until the vehicle is stopped.

10. The apparatus for emergency stopping of a vehicle according to claim 9, wherein the means for activating the emergency stopping of the motor vehicle includes an emergency stop button.

11. The apparatus for emergency stopping of a vehicle according to claim 10, wherein the motor vehicle is a self-driving vehicle and the emergency stop button is configured to be accessible by a passenger.

12. The apparatus for emergency stopping of a vehicle according to claim 9, wherein the apparatus includes an automatic braking system whereby the method utilizes portions of the automatic braking system for rapidly stopping the vehicle.

13. The apparatus for emergency stopping of a vehicle according to claim 9, wherein the means for activating the emergency stopping of the motor vehicle is configured to be implemented via the operator stepping on vehicle brakes.

14. The apparatus for emergency stopping of a vehicle according to claim 9, wherein the system is configured implementing the activation via the operator stepping on vehicle brakes past a certain activation threshold on the brakes.

15. The apparatus for emergency stopping of a vehicle according to claim 9, wherein the system is configured for activating the emergency stopping of the motor vehicle automatically via sensors in the vehicle.

16. The apparatus for emergency stopping of a vehicle according to claim 9, wherein the system is configured for stopping the vehicle only when the outside temperature is below forty degrees Fahrenheit.

* * * * *